(12) United States Patent
Sasano et al.

(10) Patent No.: US 11,054,253 B2
(45) Date of Patent: Jul. 6, 2021

(54) GAP MEASUREMENT DEVICE AND GAP MEASUREMENT METHOD

(71) Applicant: MITSUBISHI HEAVY INDUSTRIES, LTD., Tokyo (JP)

(72) Inventors: Yuichi Sasano, Tokyo (JP); Kei Yoshitomi, Tokyo (JP); Takuya Goto, Tokyo (JP); Takahiro Kubota, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 441 days.

(21) Appl. No.: 15/778,633

(22) PCT Filed: Nov. 24, 2016

(86) PCT No.: PCT/JP2016/084834
§ 371 (c)(1),
(2) Date: May 24, 2018

(87) PCT Pub. No.: WO2017/126218
PCT Pub. Date: Jul. 27, 2017

(65) Prior Publication Data
US 2018/0347973 A1    Dec. 6, 2018

(30) Foreign Application Priority Data

Jan. 20, 2016 (JP) .............................. JP2016-009096

(51) Int. Cl.
*G01B 21/16* (2006.01)
*G01B 17/02* (2006.01)
(Continued)

(52) U.S. Cl.
CPC .............. *G01B 21/16* (2013.01); *G01B 7/14* (2013.01); *G01B 11/14* (2013.01); *G01B 17/02* (2013.01)

(58) Field of Classification Search
CPC .......... G01B 21/16; G01B 7/14; G01B 17/02; G01B 11/14
See application file for complete search history.

(56) References Cited

U.S. PATENT DOCUMENTS 4,165,178 A    8/1979   Coumo, Jr. et al.
4,864,147 A    9/1989   Ikari et al.
(Continued)

FOREIGN PATENT DOCUMENTS

CN    103512904 A    1/2014
CN    104525722 A    4/2015
(Continued)

OTHER PUBLICATIONS

Office Action for Japanese Application No. 2016-009096 dated Jun. 4, 2019; 5pp.
(Continued)

*Primary Examiner* — Ian J Lobo
(74) *Attorney, Agent, or Firm* — Hauptman Ham, LLP

(57) ABSTRACT

A gap measurement device for measuring a gap between an upper plate and a lower plate in a material formed of the upper plate and the lower plate that overlap with each other in the Z-axis direction, which is the thickness direction. The gap measurement device has an ultrasonic sensor that functions as a plate thickness measurement sensor for measuring a plate thickness that is the thickness of the upper plate, a laser sensor that functions as a step measurement sensor for measuring a step that is the distance between the upper surface of the upper plate and the upper surface of the lower plate, and a calculation unit for calculating the gap between the upper plate and lower plate by subtracting the plate thickness from the step.

14 Claims, 8 Drawing Sheets

(51) Int. Cl.
   *G01B 11/14* (2006.01)
   *G01B 7/14* (2006.01)

(56) References Cited

U.S. PATENT DOCUMENTS

| | | | | |
|---|---|---|---|---|
| 5,113,358 | A | * | 5/1992 | Reber .................... G01B 21/08 |
| | | | | 702/171 |
| 5,250,897 | A | * | 10/1993 | DiIorio .................... G01B 7/14 |
| | | | | 324/207.16 |
| 6,138,515 | A | | 10/2000 | Moufle et al. |
| 2011/0271750 | A1 | | 11/2011 | Fischer |
| 2014/0002635 | A1 | | 1/2014 | Huang et al. |
| 2019/0137251 | A1 | * | 5/2019 | Nishioka ................ G01B 21/16 |

FOREIGN PATENT DOCUMENTS

| | | |
|---|---|---|
| JP | S5784306 A | 5/1982 |
| JP | S63067908 U | 5/1988 |
| JP | S64-74405 A | 3/1989 |
| JP | H6-288713 A | 10/1994 |
| JP | H9-318342 A | 12/1997 |
| JP | 2000506270 A | 5/2000 |
| JP | 2003021509 A | 1/2003 |
| JP | 2010-101656 A | 5/2010 |
| JP | 2011237435 A | 11/2011 |

OTHER PUBLICATIONS

Office Action for Japanese Application No. 2016-009096 dated Jan. 28, 2020; 5pp.
International Search Report and Written Opinion in PCT/JP2016/084834, dated Feb. 21, 2017. 14pp.
Office Action for Chinese Application No. 201680069711.1 dated Aug. 5, 2019; 8 pgs.

* cited by examiner

GAP MEASUREMENT DEVICE AND GAP MEASUREMENT METHOD

RELATED APPLICATIONS

The present application is a National Phase of PCT/JP2016/084834, filed Nov. 24, 2016, and claims priority based on Japanese Patent Application No. 2016-009096, filed Jan. 20, 2016.

TECHNICAL FIELD

The present invention relates to a gap measurement device and a gap measurement method.

BACKGROUND ART

Clearance gauges have been used in the related arts to measure gaps that are too narrow to be measured by vernier calipers, taper gauges, or the like. A clearance gauge is a tool that is formed of thin metal plates called "leaf" and the leaf is inserted into a gap to measure the dimensions of the gap. To measure the dimensions of a gap precisely, the leaf of such a clearance gauge needs to be inserted horizontally relative to the gap. Patent Document 1 discloses a gap measurement method in which the positions of two triangles formed on both sides of a face-to-face gap are measured through pattern matching, and the gap is measured on the basis of the positions of the two triangles.

PRIOR ART DOCUMENTS

Patent Document

Patent Document 1: JP 06-288713 A

SUMMARY OF THE INVENTION

Problem to be Solved by the Invention

However, when such a clearance gauge is used for measurement of a gap, the degree to which the leaf is horizontal to the gap during insertion may differ between workers who are using the clearance gauge. The leaf may also damage the material forming the gap. A heavy burden may also be placed on the workers in a case where there are many areas where a gap is to be measured.

With the method disclosed in Patent Document 1, the shape of the entities forming the gap is a requirement, e.g. triangles are formed on both sides of the gap. Thus, gaps in materials formed of plates that overlap with each other in a thickness direction cannot be measured.

Having been achieved in light of the foregoing, an object of the present invention is to provide a gap measurement device and a gap measurement method that, when measuring a gap in a material formed of plates that overlap with each other in a thickness direction, suppresses non-uniformities between workers and reduces damage to the material forming the gap.

Means for Solving the Problem

To solve the above-described problem and achieve the object, a gap measurement device according to the present invention is a measurement device that measures a gap between an upper plate and a lower plate in a material formed of the upper plate and the lower plate that overlap with each other in a thickness direction, and includes: a plate thickness measurement sensor that measures a plate thickness, the plate thickness being a thickness of the upper plate; a step measurement sensor that measures a step, the step being a distance between an upper surface of the upper plate and an upper surface of the lower plate; and a calculation unit that calculates the gap between the upper plate and the lower plate by subtracting the plate thickness from the step.

This gap measurement device calculates the gap by subtracting the plate thickness measured by the plate thickness measurement sensor from the step measured by the step measurement sensor, and can therefore suppress non-uniformities between workers and reduce situations where the material forming the gap is damaged.

Preferably, the gap measurement device according to the present invention further includes: a displacement sensor that measures a first displacement, the first displacement being a displacement, in the thickness direction, of a support portion supporting the plate thickness measurement sensor in a vertical direction; and an attitude determination unit that determines an attitude of the plate thickness measurement sensor facing the upper surface of the upper plate, wherein the step measurement sensor measures a second displacement and a first attitude angle, the second displacement being a displacement of the step measurement sensor in the thickness direction, and the first attitude angle being an attitude angle of the step measurement sensor facing the upper surface of the upper plate; the calculation unit calculates a second attitude angle on the basis of a distance between the plate thickness measurement sensor and the step measurement sensor at each of measurement points, the first displacement, and the second displacement, the second attitude angle being a component of the attitude angle of the plate thickness measurement sensor facing the upper surface of the upper plate; and the attitude determination unit determines the attitude on the basis of the first attitude angle and the second attitude angle. Through this, whether the attitudes of the sensors are suitable for measuring the gap can be determined, and thus non-uniformities between workers can be suppressed more reliably.

Preferably, the gap measurement device according to the present invention that includes the attitude determination unit further includes a gonio stage that grips the plate thickness measurement sensor, the step measurement sensor, and the displacement sensor such that the plate thickness measurement sensor, the step measurement sensor, and the displacement sensor are movable along a circular arc plane that takes a distance from the upper surface of the upper plate as a radius, wherein in a case where the attitude is determined to be unsuitable for measuring the gap, the calculation unit calculates a correction value for the attitude and sends the correction value to the gonio stage; and the gonio stage corrects the attitude in accordance with the correction value received from the calculation unit. Through this, the attitudes of the sensors can be corrected to suitable attitudes for measuring the gap, and thus non-uniformities between workers can be suppressed even more reliably.

Preferably, in the gap measurement device according to the present invention, the displacement sensor further measures a pressure applied to the upper plate by the plate thickness measurement sensor. Through this, when measuring the gap formed between the upper plate and the lower plate constituting the material with the upper plate and the lower plate not joined to each other, the pressure, which is one condition of measuring the gap, can be measured.

Preferably, in the gap measurement device according to the present invention, the plate thickness measurement sensor is an ultrasonic sensor that emits ultrasonic waves toward the upper surface of the upper plate from above the upper plate and detects the ultrasonic waves reflected by the upper surface and a lower surface of the upper plate. Through this, the use of ultrasonic waves allows the plate thickness to be measured accurately with contact made only with the upper surface of the upper plate, and thus situations where the material forming the gap is damaged can be more reliably reduced while the accuracy of the gap measurement can be improved.

Preferably, in the gap measurement device according to the present invention, the plate thickness measurement sensor includes a roller sensor unit, the roller sensor unit being supported so as to be rotatable about an axis extending in a direction parallel to the material, and rotating in response to movement along the material. Through this, the rotation of the roller sensor unit upon the material allows the sensors to be continuously moved along the material, and thus a plurality of gap measurement points can be measured consecutively.

Preferably, the gap measurement device according to the present invention, in which the plate thickness measurement sensor includes the roller sensor unit, further includes a roller provided parallel to the roller sensor unit, the roller being supported so as to be rotatable about an axis parallel to an axis of the roller sensor unit, and rotating along with the roller sensor unit in response to movement along the material. Through this, the roller sensor unit can be continuously moved in a stable manner along the material, and non-uniformities between workers can thus be more reliably suppressed even when the measurement is consecutively performed at a plurality of gap measurement points.

Preferably, in the gap measurement device according to the present invention, the step measurement sensor is a laser sensor that emits a laser from above the upper plate toward an area where both the upper plate and the lower plate are exposed on top of the material, and detects the laser reflected by the upper surface of the upper plate and the upper surface of the lower plate. Through this, the use of the laser allows the step to be measured accurately with no contact made with the material, and thus situations where the material forming the gap is damaged can be more reliably reduced while the accuracy of the gap measurement can be improved.

Preferably, the gap measurement device according to the present invention further includes a driving device that grips the plate thickness measurement sensor and the step measurement sensor such that the plate thickness measurement sensor and the step measurement sensor are movable in three-dimensional directions. Through this, the sensors can be moved along the material automatically, and thus non-uniformities between workers can be suppressed while the burden on the workers can be reduced.

A gap measurement method according to the present invention for measuring a gap between an upper plate and a lower plate in a material formed of the upper plate and the lower plate that overlap with each other in a thickness direction, and includes the steps of: measuring a plate thickness with a plate thickness measurement sensor, the plate thickness being a thickness of the upper plate; measuring a step with a step measurement sensor, the step being a distance between an upper surface of the upper plate and an upper surface of the lower plate; and calculating the gap between the upper plate and the lower plate by subtracting the plate thickness from the step.

This gap measurement method is used for calculating the gap by subtracting the plate thickness measured by the plate thickness measurement sensor from the step measured by the step measurement sensor, therefore making it possible to suppress non-uniformities between workers and reduce situations where the material forming the gap is damaged.

Preferably, the gap measurement method according to the present invention further includes the steps of: measuring a first displacement, the first displacement being a displacement, in the thickness direction, of a support portion supporting the plate thickness measurement sensor in a vertical direction; measuring a second displacement, the second displacement being a displacement, in the thickness direction, of the step measurement sensor; measuring a first attitude angle, the first attitude angle being an attitude angle of the step measurement sensor facing the upper surface of the upper plate; calculating a second attitude angle on the basis of a distance between the plate thickness measurement sensor and the step measurement sensor at each of measurement points, the first displacement, and the second displacement, the second attitude angle being a component of the attitude angle of the plate thickness measurement sensor facing the upper surface of the upper plate; and determining the attitude on the basis of the first attitude angle and the second attitude angle. Through this, whether the attitudes of the sensors are suitable for measuring the gap can be determined, and thus non-uniformities between workers can be suppressed more reliably.

Preferably, the gap measurement method according to the present invention including the step of determining the attitude further includes the steps of: calculating, in a case where the attitude is determined to be unsuitable for measuring the gap, a correction value for the attitude; and correcting the attitude in accordance with the correction value. Through this the attitudes of the sensors can be corrected to suitable attitudes for measuring the gap, and thus non-uniformities between workers can be suppressed even more reliably.

Preferably, in the gap measurement method according to the present invention, the step of measuring a plate thickness measures the plate thickness by emitting ultrasonic waves toward the upper plate from above the upper plate and detecting the ultrasonic waves reflected by the upper surface and a lower surface of the upper plate. Through this, the use of ultrasonic waves allows the plate thickness to be measured accurately with contact made only with the upper surface of the upper plate, and thus situations where the material forming the gap is damaged can be more reliably reduced while the accuracy of the gap measurement can be improved.

Preferably, in the gap measurement method according to the present invention, the step of measuring a step measures the step by emitting a laser from above the upper plate toward an area where both the upper plate and the lower plate are exposed on top of the material, and detecting the laser reflected by the upper surface of the upper plate and the upper surface of the lower plate. Through this, the use of the laser allows the step to be measured accurately with no contact made with the material, and thus situations where the material forming the gap is damaged can be more reliably reduced while the accuracy of the gap measurement can be improved.

Preferably, the gap measurement method according to the present invention further includes the step of moving an area where the gap is measured along a horizontal direction of the material. Through this, the sensors can be moved along the material automatically, and thus non-uniformities between workers can be suppressed while the burden on the workers can be reduced.

Preferably, the gap measurement method according to the present invention further includes the steps of: applying a pressure to the material along the thickness direction of the material when measuring the gap; and measuring the pressure. Through this, the gap formed between the upper plate and the lower plate constituting the material can be measured even with the upper plate and the lower plate not joined to each other, and thus the gap thus formed can be measured in advance before the material is manufactured. Additionally, when measuring the gap formed between the upper plate and the lower plate constituting the material with the upper plate and the lower plate not joined to each other, the pressure, which is one condition of measuring the gap, can be measured.

Effect of Invention

According to the present invention, a gap measurement device and a gap measurement method that, when measuring a gap in a material formed of plates that overlap with each other in a thickness direction, suppresses non-uniformities between workers and reduces damage to the material forming the gap, can be achieved.

DESCRIPTION OF THE PREFERRED EMBODIMENTS

A gap measurement device and a gap measurement method according to embodiments of the present invention will be described in detail below on the basis of the drawings. Note that the present invention is not limited to the following embodiments, and the embodiments can be appropriately modified for implementation.

Figure 1:
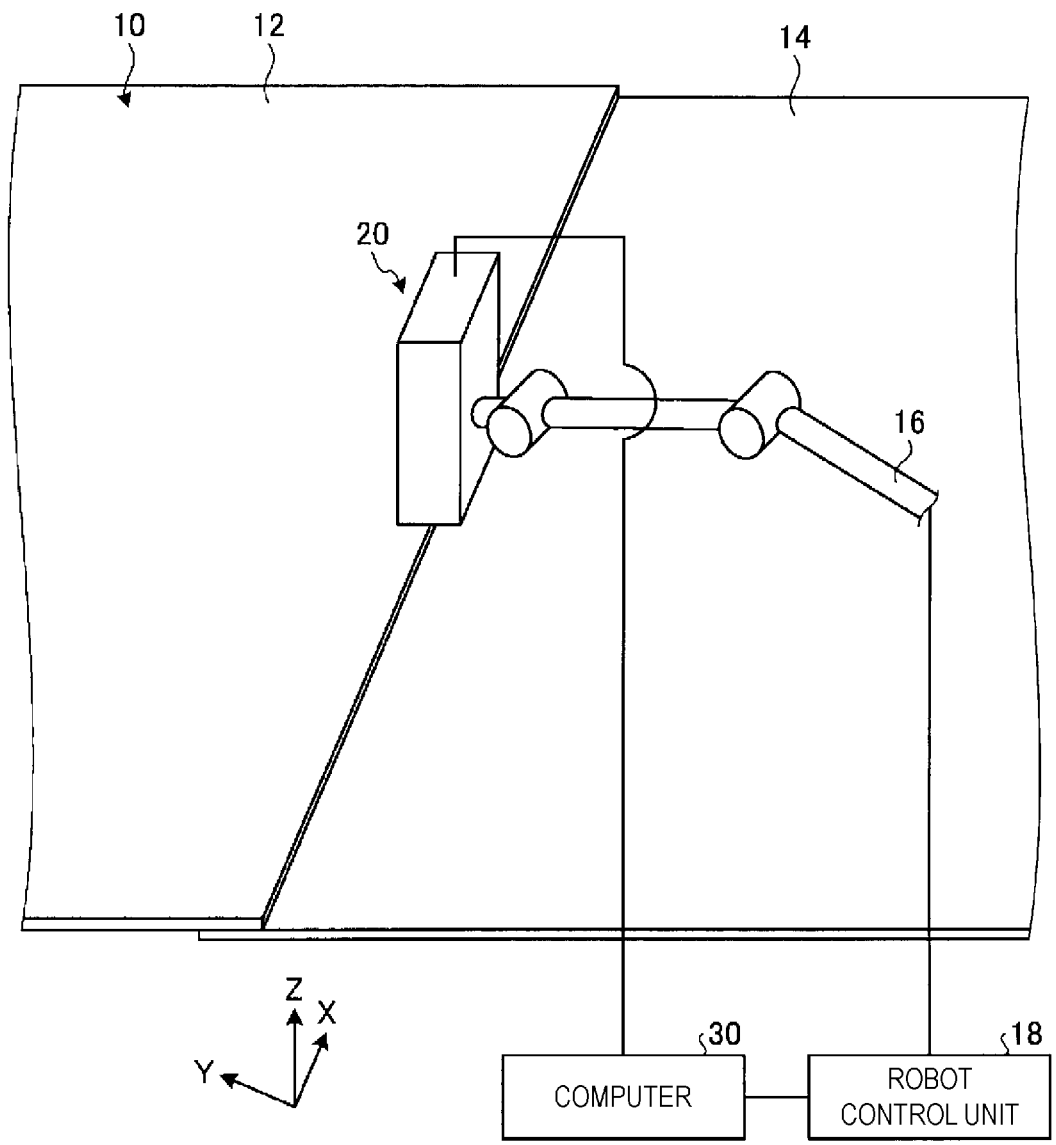
FIG. 1 is a diagram illustrating an outline of a gap measurement device according to a first embodiment of the present invention.
Figure 2:
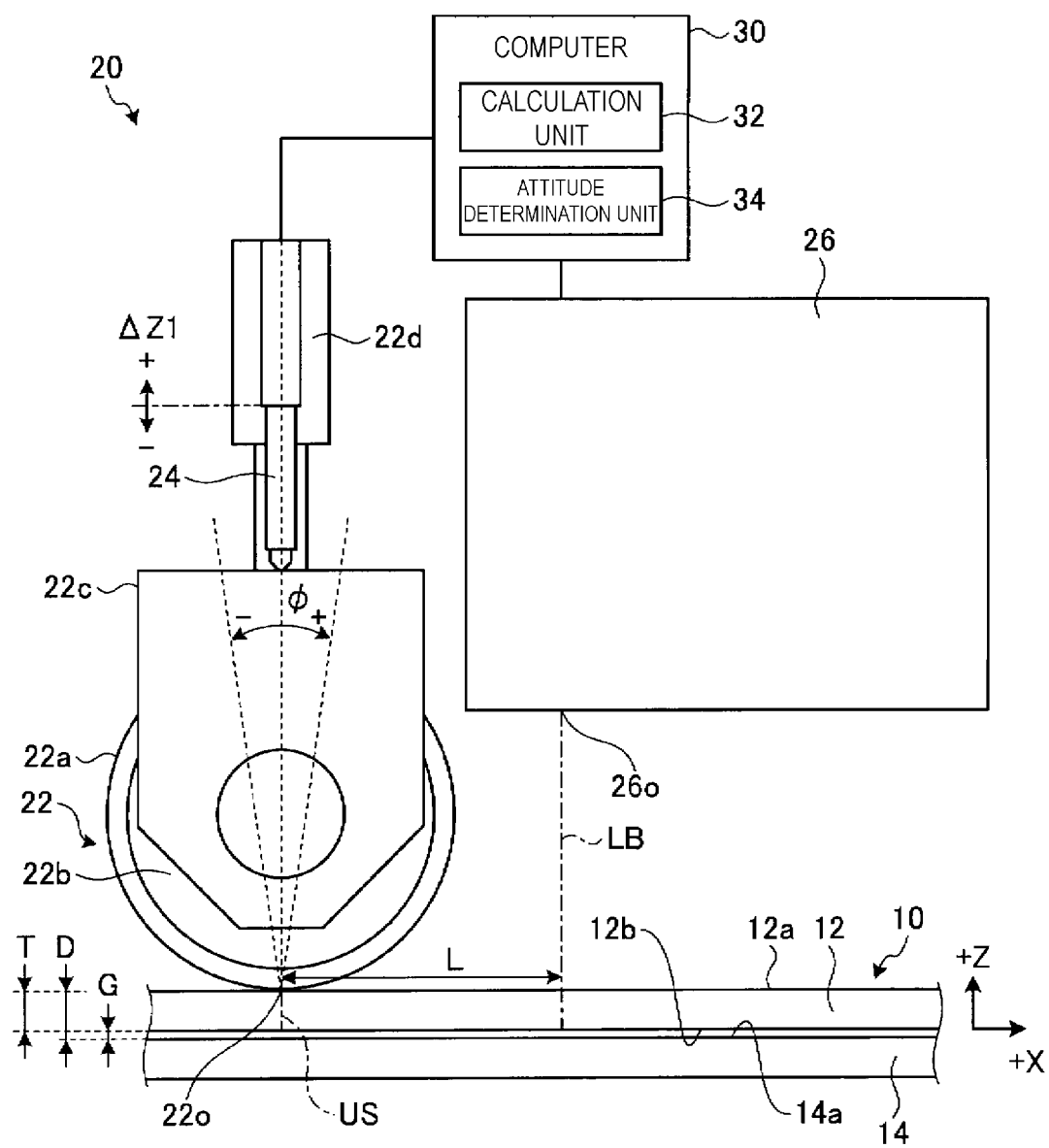
FIG. 2 is an example of a side view illustrating the configuration of the gap measurement device according to the first embodiment of the present invention.
Figure 3:
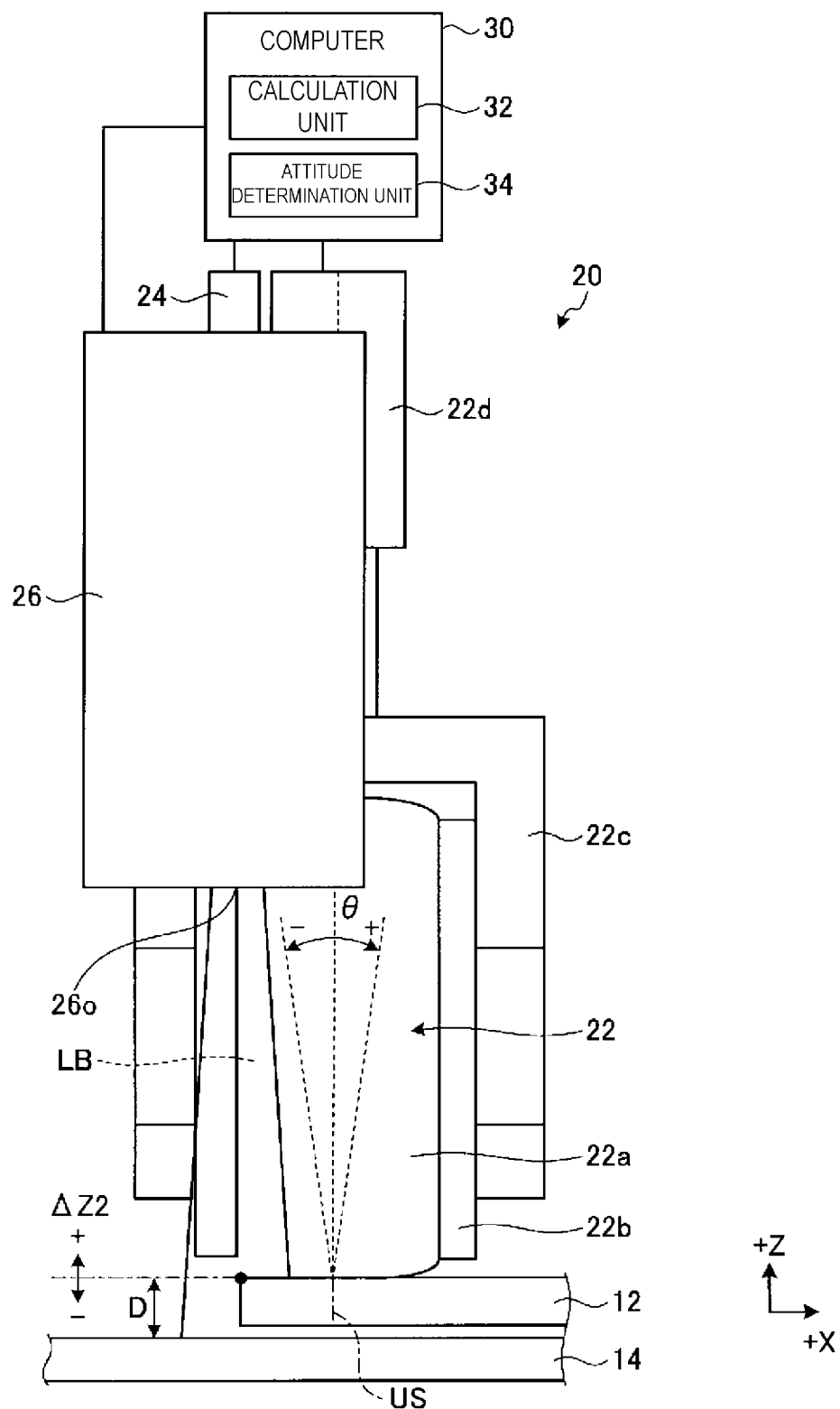
FIG. 3 is an example of a side view illustrating the configuration of the gap measurement device according to the first embodiment of the present invention.
Figure 4:
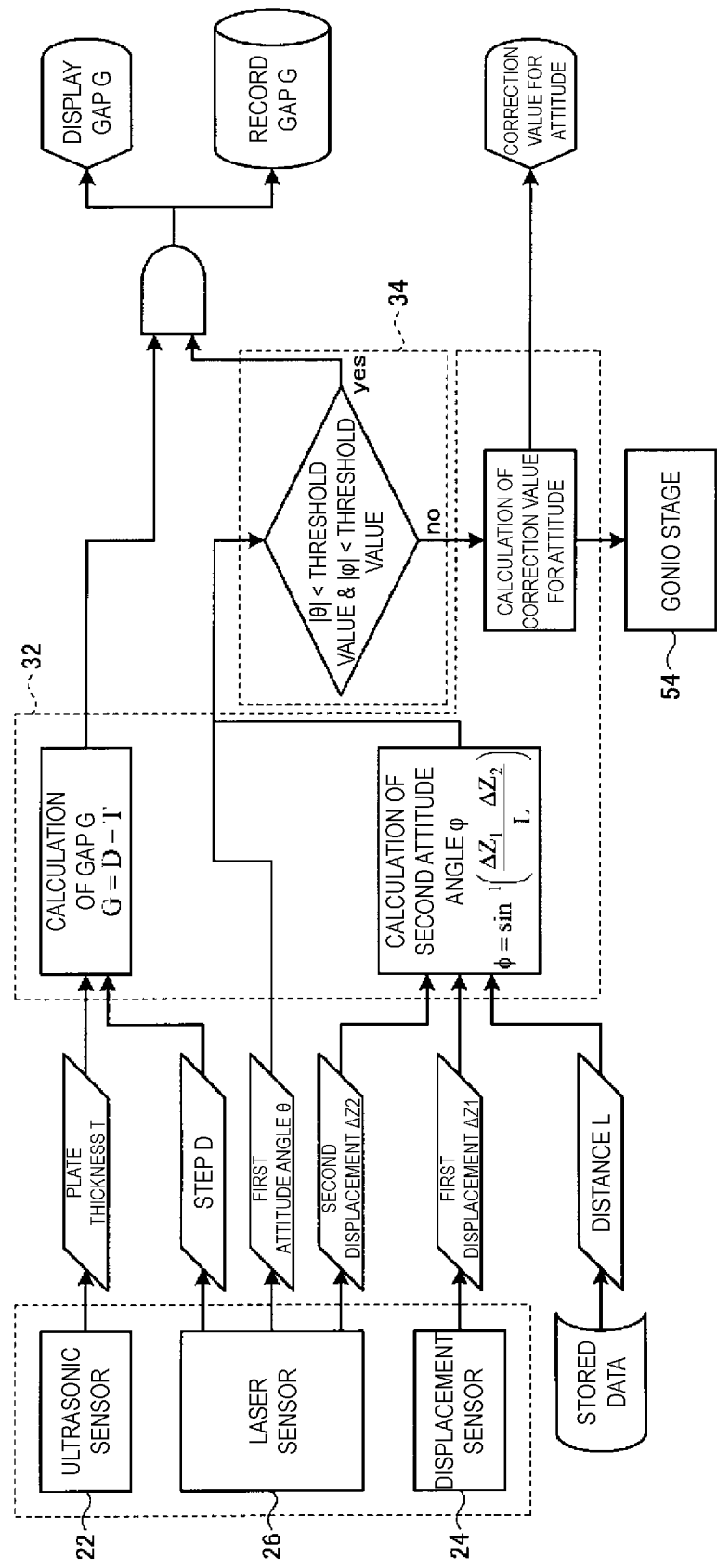
FIG. 4 is a data flow in the gap measurement device according to the first embodiment of the present invention.

FIG. 1 is a diagram illustrating an outline of a gap measurement device 20 according to a first embodiment of the present invention. FIG. 2 is an example of a side view illustrating the configuration of the gap measurement device 20 according to the first embodiment of the present invention. FIG. 2 is a side view seen from a direction orthogonal to an XZ plane, which will be described later. FIG. 3 is an example of a side view illustrating the configuration of the gap measurement device 20 according to the first embodiment of the present invention. FIG. 3 is a side view seen from a direction orthogonal to a YZ plane, which will be described later. FIG. 4 is a data flow in the gap measurement device 20 according to the first embodiment of the present invention. FIG. 4 also illustrates a data flow in a gap measurement device 50 according to a third embodiment, which will be described later. The gap measurement device 20 will be described next with reference to FIGS. 1 to 4.

As illustrated in FIG. 1, the gap measurement device 20 is used as a measurement device that measures a gap G between an upper plate 12 and a lower plate 14 (see FIG. 2). The upper plate 12 and the lower plate 14 overlap with each other in a thickness direction corresponding to a Z-axis direction to form a material 10. Specifically, as illustrated in FIG. 2, the gap G is a distance between a lower surface 12b of the upper plate 12 and an upper surface 14a of the lower plate 14. Although a worker can use the gap measurement device 20 manually, it is preferable that the gap measurement device 20 be used while held by a robot arm 16 so as to be movable in three-dimensional directions, i.e., in an X-axis direction that is orthogonal to the Z-axis direction and in which an end surface of the upper plate 12 extends, a Y-axis direction orthogonal to the X-axis direction and the Z-axis direction, and the Z-axis direction, as illustrated in FIG. 1. Although the gap measurement device 20 is held by the robot arm 16 in the present embodiment, the present invention is not limited thereto, and the gap measurement device 20 can be held by a known driving device that holds the gap measurement device 20 such that the gap measurement device 20 is movable in the three-dimensional directions. The robot arm 16 can, under the control of a robot control unit 18, automatically move the gap measurement device 20 thus held in the three-dimensional directions. Because the gap measurement device 20 is held by a driving device exemplified by the robot arm 16, sensors included in the gap measurement device 20 can be automatically moved, i.e., an area measured by an ultrasonic sensor 22 and an area measured by a laser sensor 26 can be automatically moved, above the material 10. The gap measurement device 20 can therefore automatically move a gap measurement area. Note that the area measured by the ultrasonic sensor 22 and the area measured by the laser sensor 26 can both be processed by a computer 30 communicatively connected to the robot control unit 18. Furthermore, differences in coordinates between the area measured by the ultrasonic sensor 22 and the area measured by the laser sensor 26 can be corrected by the computer 30. This enables the gap measurement device 20 to suppress non-uniformities in measurement of the gap G between workers and reduce the burden on the workers involved in measuring the gap G.

An aircraft material in a lap part or the like in the outer skin of an aircraft, in which both the upper plate 12 and the lower plate 14 are formed of aluminum alloy plates, can be given as a specific preferred example of the material 10. Preferably, the upper plate 12 and the lower plate 14 are solid plate members made from a single material, as exemplified by the aluminum alloy plates used in this aircraft material. The upper plate 12 and the lower plate 14 may have coatings of a thickness that can be ignored with respect to the thicknesses of those plates. The material 10 may be in the form of a material in which the upper plate 12 and the lower plate 14 have already been joined by joining members used as aircraft materials, such as rivets, or may be in the form of a material in which the upper plate 12 and the lower plate 14 have yet to be joined by a joining material. In other words, the gap measurement device 20 can measure the gap G before the upper plate 12 and the lower plate 14 are joined, and can measure the gap G after the upper plate 12 and the lower plate 14 have been joined. When the gap G is measured before the upper plate 12 and the lower plate 14 are joined to each other, it is preferable that the gap measurement device 20 measure the gap G while applying pressure to an upper surface 12a of the upper plate 12 from above. In the present embodiment, the pressure is 30 kPa, for example. A roller sensor unit 22a of the ultrasonic sensor 22 may be pressed onto the upper surface 12a of the upper plate 12 from above the material 10 to apply the pressure. Alternatively, a pressurizing device provided near the gap measurement device 20 may be used to apply the pressure. In this case, the gap G thus formed can be measured in advance before the material 10 is joined.

As illustrated in FIGS. 2 and 3, the gap measurement device 20 includes the ultrasonic sensor 22, which functions as a plate thickness measurement sensor; a displacement sensor 24, which measures a first displacement that is a displacement in a vertical direction of a support part supporting the ultrasonic sensor 22, i.e. in the Z-axis direction; the laser sensor 26, which functions as a step measurement sensor; and the computer 30. The computer 30 is communicatively connected to the ultrasonic sensor 22, the displacement sensor 24, and the laser sensor 26, and controls and supports the measurements of the sensors. The computer 30 includes a calculation unit 32 that carries out predetermined calculation operations on information obtained from the measurements to obtain new numerical information, and an attitude determination unit 34 that determines an attitude of the ultrasonic sensor 22 facing the upper surface 12a of the upper plate 12.

The ultrasonic sensor 22 includes the roller sensor unit 22a, side surface members 22b, a shaft support member 22c, and a vertical support member 22d. The roller sensor unit 22a is shaped as a roller, and is supported so as to be rotatable about an axis extending in a direction parallel to the material 10, to be more specific, an axis extending in the Y-axis direction. The roller sensor unit 22a includes an ultrasonic detection unit 22s (see FIGS. 5 and 6) that generates and emits ultrasonic waves in a circumferential direction and detects ultrasonic waves entering from the circumferential direction. The side surface members 22b are members provided on both side surfaces of the roller sensor unit 22a. In the side surface members 22b, side surfaces facing side surfaces of the roller sensor unit 22a are planar in shape, and side surfaces on the sides opposite from the sides facing the roller sensor unit 22a have, in central regions thereof, cylindrical shaft projecting portions extending in an axial direction of the roller sensor unit 22a. The shaft support member 22c is a member having a U shape so as to enclose the side surfaces of the side surface members 22b that do not face the side surfaces of the roller sensor unit 22a. The shaft support member 22c has fitting holes, into which the projecting portions of the side surface members 22b are fitted, in areas corresponding to the positions of the projecting portions. The shaft support member 22c supports the roller sensor unit 22a and the side surface members 22b provided on both side surfaces thereof such that the roller sensor unit 22a and the side surface members 22b are rotatable about an axis. The vertical support member 22d is a rod-shaped member extending in the Z-axis direction, and is fixed to an area of the shaft support member 22c spanning the roller sensor unit 22a and the side surface members 22b, i.e. a central area of the U shape. The vertical support member 22d supports the shaft support member 22c from upward in the Z-axis direction. The ultrasonic sensor 22 is configured as described above, and is supported from above in the Z-axis direction by a support mechanism shared with the laser sensor 26. In the ultrasonic sensor 22, the roller sensor unit 22a and the side surface members 22b functions as movable portions of the roller, and the shaft support member 22c and the vertical support member 22d functions as fixed portions of the roller. In the ultrasonic sensor 22, the roller sensor unit 22a rotates as the gap measurement device 20 moves in the X-axis direction along the material 10. In other words, with the ultrasonic sensor 22 supported from above in the Z-axis direction, the roller sensor unit 22a moves in the X-axis direction along the upper surface 12a of the upper plate 12 while rotating.

In the ultrasonic sensor 22, the ultrasonic detection unit 22s within the roller sensor unit 22a generates and emits ultrasonic waves US toward the upper surface 12a of the upper plate 12 from an ultrasonic wave emission port 22o located above the upper plate 12. In the ultrasonic sensor 22, the ultrasonic detection unit 22s within the roller sensor unit 22a detects ultrasonic waves US reflected by the upper surface 12a and the lower surface 12b of the upper plate 12. When the ultrasonic waves US are generated and emitted, the area where the reflected ultrasonic waves US are detected corresponds to a measurement area of the ultrasonic sensor 22. The ultrasonic sensor 22 thus obtains information on the generated ultrasonic waves US and the detected ultrasonic waves US. The information on the ultrasonic waves US generated by the ultrasonic sensor 22 and the ultrasonic waves US detected by the ultrasonic sensor 22 is used to measure a plate thickness T, which is the thickness of the upper plate 12. In other words, the ultrasonic sensor 22 measures the plate thickness T. Although the plate thickness measurement sensor is the ultrasonic sensor 22 in the present embodiment, the sensor is not limited thereto. A known measurement sensor that employs a medium partially transmitted through the upper plate 12 and reflected by the upper surface 12a and the lower surface 12b of the upper plate 12 can be used instead.

Like the ultrasonic sensor 22, the displacement sensor 24 is supported from above in the Z-axis direction. A tip portion of the displacement sensor 24 is fixed so as to contact an upper surface of the shaft support member 22c. Although a damper is used as the displacement sensor 24 in the present embodiment, the sensor is not limited thereto, and a known displacement sensor can be used. The displacement sensor 24 measures a first displacement $\Delta Z1$, which is a displacement of the shaft support member 22c and the vertical support member 22d in the Z-axis direction. Information on the first displacement $\Delta Z1$ includes information on an attitude angle, which is a solid angle of the ultrasonic sensor 22 facing the upper surface 12a of the upper plate 12. In other words, the information on the first displacement $\Delta Z1$ includes information in which a first attitude angle $\theta$, which is a first component of the attitude angle, and a second attitude angle $\varphi$, which is a second component of the attitude angle, are mixed. As illustrated in FIG. 3, the first attitude angle $\theta$ is an angle, in a rotational direction about the X-axis, of the laser sensor 26 facing the upper surface 12a of the upper plate 12, and based on the way in which the ultrasonic sensor 22 and the laser sensor 26 are supported and the like, is the same as an angle, in the rotational direction about the X-axis, of the ultrasonic sensor 22 facing the upper surface 12a of the upper plate 12. As illustrated in FIG. 2, the second attitude angle φ is an angle, in a rotational direction about the Y-axis, of the ultrasonic sensor 22 facing the upper surface 12a of the upper plate 12.

The information on the first displacement ΔZ1 also includes information on pressure applied by the gap measurement device 20 to the upper surface 12a of the upper plate 12 from above using the roller sensor unit 22a of the ultrasonic sensor 22. In other words, when the gap G is measured, the displacement sensor 24 can measure pressure, which is one condition of measuring the gap G.

The laser sensor 26 is supported from above in the Z-axis direction by the support mechanism shared with the ultrasonic sensor 22. The laser sensor 26 emits a laser beam LB from a laser emission port 26o above the upper plate 12, to the vicinity of an end surface of the upper plate 12, i.e. at an area where both the upper surface 12a of the upper plate 12 and the upper surface 14a of the lower plate 14 are exposed on top of the material 10. The laser sensor 26 detects the laser beam LB reflected by the upper surface 12a of the upper plate 12 and the upper surface 14a of the lower plate 14. The laser sensor 26 therefore obtains information on the emitted laser beam LB and of the detected laser beam LB. When the laser beam LB is emitted, the area where the reflected laser beam LB is detected corresponds to a measurement area of the laser sensor 26. The information on the laser beam LB emitted by the laser sensor 26 and on the laser beam LB detected by the laser sensor 26 includes information on the upper surface 12a of the upper plate 12, and information on the upper surface 14a of the lower plate 14, measured with the laser beam LB. Accordingly, the information on the laser beam LB emitted by the laser sensor 26 and on the laser beam LB detected by the laser sensor is used for measurement of a step D, which is a distance between the upper surface 12a of the upper plate 12 and the upper surface 14a of the lower plate 14. In other words, the laser sensor 26 measures the step D.

The information on the laser beam LB emitted by the laser sensor 26 and on the laser beam LB detected by the laser sensor 26 is used for measurement of the distance between the laser emission port 26o and the upper surface 12a of the upper plate 12, allowing the information to be used for measurement of a second displacement ΔZ2, which is a displacement of the laser sensor 26 in the Z-axis direction. In other words, the laser sensor 26 measures the second displacement ΔZ2. The information on the second displacement ΔZ2 includes the information on the first attitude angle θ. In other words, the laser sensor 26 measures the first attitude angle θ. Although the step measurement sensor is the laser sensor 26 in the present embodiment, the sensor is not limited thereto. A known measurement sensor that employs a medium reflected by the upper surface 12a of the upper plate 12 and the upper surface 14a of the lower plate 14 can be used instead.

As illustrated in FIG. 4, the calculation unit 32 obtains information on the plate thickness T from the ultrasonic sensor 22 and information on the step D from the laser sensor 26. As indicated by Equation 1, the calculation unit 32 calculates the gap G by subtracting the plate thickness T from the step D. The calculation unit 32 can cause the calculated value of the gap G to be displayed in a display unit connected to the computer 30, or can record the calculated value of the gap G by causing that value to be stored in a storage unit within the computer 30 or connected externally to the computer 30.

$$\text{gap } G = \text{step } D - \text{plate thickness } T \qquad \text{Equation 1}$$

The calculation unit 32 obtains information on the first displacement ΔZ1 from the displacement sensor 24, and obtains information on the second displacement ΔZ2 from the laser sensor 26. The calculation unit 32 also obtains, from a storage unit connected to the computer 30, information on a distance L between the ultrasonic sensor 22 and the laser sensor 26 at each of measurement points. This information is one type of stored data. As indicated in Equation 2, the calculation unit 32 calculates the second attitude angle φ on the basis of the distance L, the first displacement ΔZ1, and the second displacement ΔZ2. The calculation unit 32 outputs the information on the second attitude angle φ to the attitude determination unit 34.

$$\text{second attitude angle } \varphi = \sin^{-1}((\text{first displacement } \Delta Z1 - \text{second displacement } \Delta Z2)/\text{distance} L) \qquad \text{Equation 2}$$

Figure 5:
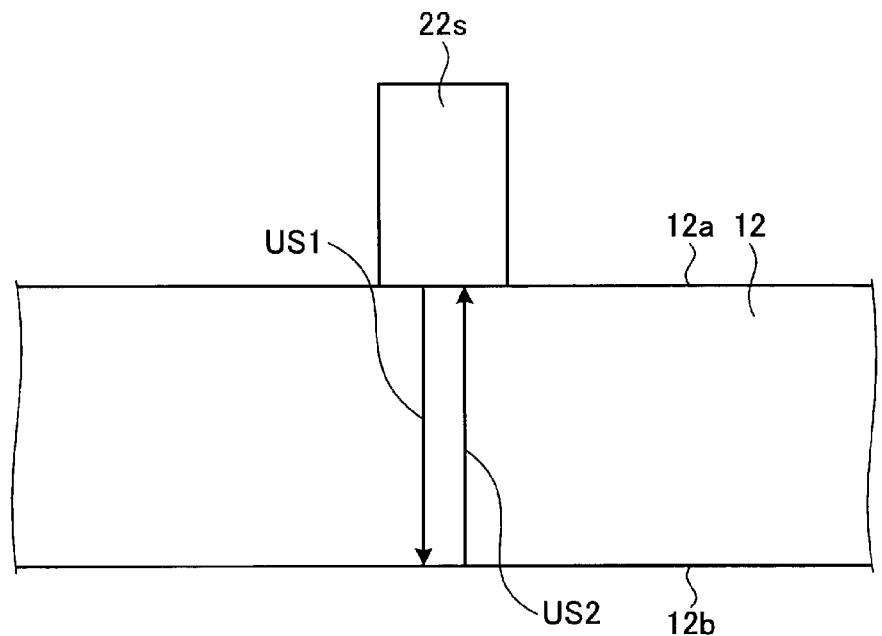
FIG. 5 is a diagram illustrating a relationship in which the positional relationship between an ultrasonic detection unit and an upper plate correlates with a path of ultrasonic waves.
Figure 6:
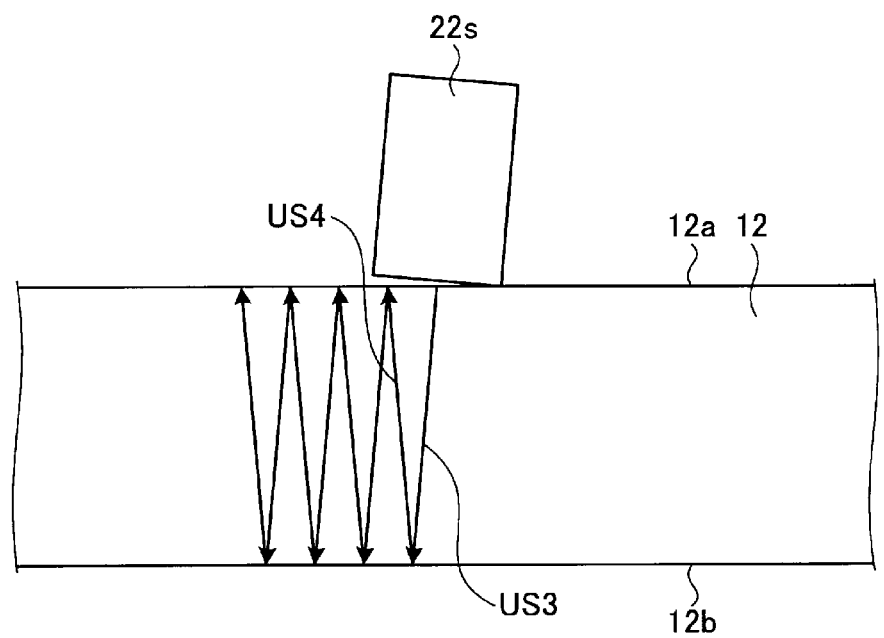
FIG. 6 is a diagram illustrating a relationship in which the positional relationship between the ultrasonic detection unit and the upper plate correlates with the path of ultrasonic waves.

FIG. 5 is a diagram illustrating a relationship in which the positional relationship between the ultrasonic detection unit 22s and the upper plate 12 correlates with the path of the ultrasonic waves US. FIG. 6 is a diagram illustrating a relationship in which the positional relationship between the ultrasonic detection unit 22s and the upper plate 12 correlates with the path of the ultrasonic waves US. The attitude of the gap measurement device 20, i.e. the suitable attitude of the gap measurement device 20 for measuring the gap G, will be described with reference to FIGS. 5 and 6. As illustrated in FIG. 5, with the gap measurement device 20, when the ultrasonic sensor 22 is oriented in the Z-axis direction with respect to the upper surface 12a of the upper plate 12, the ultrasonic detection unit 22s emits emission waves US1 along the Z-axis direction toward the upper surface 12a of the upper plate 12. The emission waves US1 are reflected by the lower surface 12b of the upper plate 12 and become reflection waves US2 progressing along the Z-axis direction. The reflection waves US2 are detected by the ultrasonic detection unit 22s, and the plate thickness T can be suitably measured; as such, this attitude is a suitable attitude for measuring the gap G. However, as illustrated in FIG. 6, with the gap measurement device 20, when the ultrasonic sensor 22 is slanted relative to the Z-axis direction with respect to the upper surface 12a of the upper plate 12, the ultrasonic detection unit 22s emits emission waves US3, in a direction slanted relative to the Z-axis direction, toward the upper surface 12a of the upper plate 12. The emission waves US3 are reflected by the lower surface 12b of the upper plate 12 and become reflection waves US4 progressing in a direction slanted relative to the Z-axis direction. The reflection waves US4 are not detected by the ultrasonic detection unit 22s, and the plate thickness T cannot be suitably measured; as such, this attitude is an unsuitable attitude for measuring the gap G. In other words, when measuring the gap G, putting the gap measurement device 20 in an attitude in which the ultrasonic sensor 22 is not slanted relative to the Z-axis direction with respect to the upper surface 12a of the upper plate 12 makes it possible to measure the distance of the gap accurately.

The attitude determination unit 34 determines the attitude of the gap measurement device 20, i.e., determines whether the attitude of the gap measurement device 20 is an attitude suitable for measuring the gap G. As illustrated in FIG. 4, the attitude determination unit 34 obtains the information on the second attitude angle φ from the calculation unit 32. The attitude determination unit 34 obtains the information on the first attitude angle θ from the laser sensor 26. The attitude determination unit 34 determines the attitude of the gap measurement device 20 on the basis of the first attitude angle θ and the second attitude angle φ. Specifically, the attitude determination unit 34 first determines whether the first attitude angle θ is within a range defined by a threshold value, e.g., within a range of from −0.5° to 0.5°, as indicated by Relationship 3. The attitude determination unit 34 then determines whether the second attitude angle φ is within a range defined by a threshold value, e.g., within a range of from −0.5° to 0.5°, as indicated by Relationship 4. In a case where the attitude determination unit 34 determines that both the first attitude angle θ and the second attitude angle φ are within the predetermined ranges, the attitude is determined to be suitable, i.e., a suitable attitude for the gap measurement device 20 to measure the gap G. However, in a case where the attitude determination unit 34 determines that at least one of the first attitude angle θ and the second attitude angle φ is not within the predetermined range, the attitude is determined to be unsuitable, i.e., an unsuitable attitude for the gap measurement device 20 to measure the gap G. The attitude determination unit 34 outputs the results of determining the attitude to the calculation unit 32.

$$-0.5° \leq \text{first attitude angle } \theta \leq 0.5° \quad \text{Relationship 3}$$

$$-0.5° \leq \text{second attitude angle } \varphi \leq 0.5° \quad \text{Relationship 4}$$

The calculation unit 32 obtains the results of determining the attitude from the attitude determination unit 34. In a case where the value of the gap G is to be displayed or stored, the calculation unit 32 can also cause the results of determining the attitude from the attitude determination unit 34 to be displayed or stored. Alternatively, the calculation unit 32 can cause the value of the gap G to be displayed or stored only when the determination results indicate the attitude is suitable; when the determination results indicate the attitude is unsuitable, rather than causing the value of the gap G to be displayed or stored, the calculation unit 32 can cause the gap G to be measured again after the attitude of the gap measurement device 20 has been corrected.

Figure 7:
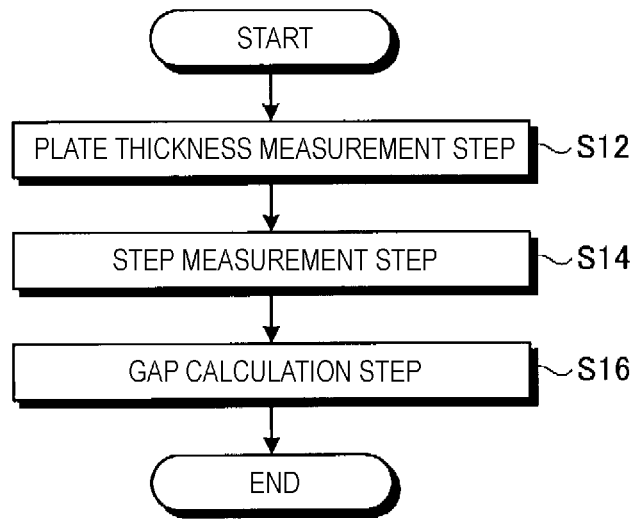
FIG. 7 is a flowchart illustrating a gap measurement method according to the first embodiment of the present invention.
Figure 8:
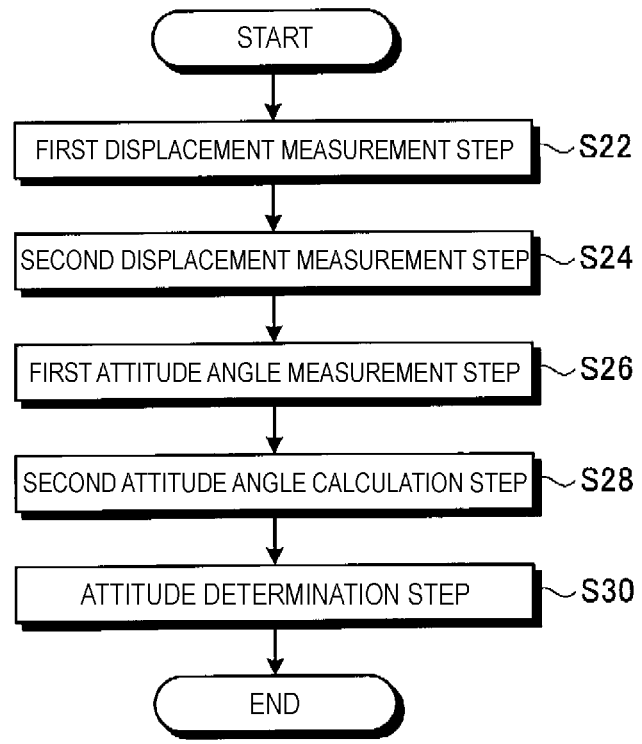
FIG. 8 is a flowchart pertaining to attitude determination in the gap measurement method according to the first embodiment of the present invention.

Actions of the gap measurement device 20 according to the first embodiment having the above configuration will be described below. The gap measurement device 20 executes a gap measurement method according to the first embodiment of the present invention. FIG. 7 is a flowchart illustrating the gap measurement method according to the first embodiment of the present invention. FIG. 8 is a flowchart pertaining to attitude determination in the gap measurement method according to the first embodiment of the present invention. The gap measurement method executed by the gap measurement device 20 will be described with reference to FIGS. 7 and 8.

As illustrated in FIG. 7, the gap measurement method according to the first embodiment of the present invention includes a plate thickness measurement step S12, a step measurement step S14, and a gap calculation step S16. First, in the gap measurement device 20, the roller sensor unit 22a of the ultrasonic sensor 22 is disposed near the end surface of the upper plate 12, so as to be movable along the upper surface 12a of the upper plate 12 in the X-axis direction in which the end surface extends. Accordingly, in the gap measurement device 20, the laser emission port 26o of the laser sensor 26 is disposed above the vicinity of the end surface of the upper surface 12a of the upper plate 12.

In the ultrasonic sensor 22, the ultrasonic detection unit 22s emits the ultrasonic waves US from the ultrasonic wave emission port 22o toward the upper plate 12. In the ultrasonic sensor 22, the ultrasonic detection unit 22s detects the ultrasonic waves US reflected by the upper surface 12a and the lower surface 12b of the upper plate 12. The ultrasonic sensor 22 measures the plate thickness T on the basis of the information on the emitted ultrasonic waves US and the detected ultrasonic waves US (step S12).

The laser sensor 26 emits the laser beam LB from the laser emission port 26o toward the upper plate 12 and the lower plate 14. The laser sensor 26 detects the laser beam LB reflected by the upper surface 12a of the upper plate 12 and the upper surface 14a of the lower plate 14. The laser sensor 26 measures the step D on the basis of the information on the emitted laser beam LB and the detected laser beam LB (step S14).

Note that the plate thickness measurement step S12 and the step measurement step S14 may be carried out in this order, at the same time, or in the reverse order.

After the plate thickness measurement step S12 and the step measurement step S14 have been carried out, the calculation unit 32 obtains the information on the plate thickness T from the ultrasonic sensor 22 and obtains the information on the step D from the laser sensor 26. The calculation unit 32 calculates the gap G by subtracting the plate thickness T from the step D (step S16). The calculation unit 32 can cause the calculated value of the gap G to be displayed in a display unit connected to the computer 30, or can record the value by causing the value to be stored in a storage unit within the computer 30 or connected externally to the computer 30.

As described above, the gap measurement method carried out by the gap measurement device 20 according to the first embodiment includes steps S12 to S16. In other words, the gap measurement method carried out by the gap measurement device 20 according to the first embodiment calculates the gap G by subtracting the plate thickness T measured by the plate thickness measurement sensor from the step D measured by the step measurement sensor, which makes it possible to suppress non-uniformities between workers and reduce situations where the material forming the gap is damaged.

Preferably, the gap measurement method according to the first embodiment of the present invention further includes a first displacement measurement step S22, a second displacement measurement step S24, a first attitude angle measurement step S26, a second attitude angle calculation step S28, and an attitude determination step S30, as illustrated in FIG. 8.

The displacement sensor 24 measures the first displacement ΔZ1, which is the displacement of the shaft support member 22c and the vertical support member 22d in the Z-axis direction (step S22). The laser sensor 26 measures the second displacement ΔZ2 on the basis of the information on the emitted laser beam LB and the detected laser beam LB (step S24).

Note that the first displacement measurement step S22 and the second displacement measurement step S24 may be carried out in this order, at the same time, or in the reverse order.

The laser sensor 26 measures the first attitude angle θ on the basis of the information on the second displacement ΔZ2 (step S26).

After the first displacement measurement step S22 and the second displacement measurement step S24 have been carried out, the calculation unit 32 obtains the information on the first displacement ΔZ1 from the displacement sensor 24 and obtains the information on the second displacement ΔZ2 from the laser sensor 26. The calculation unit 32 also obtains, from the storage unit connected to the computer 30, the information on the distance L between the ultrasonic sensor 22 and the laser sensor 26 at each of measurement points. The calculation unit 32 calculates the second attitude angle φ on the basis of the distance L, the first displacement ΔZ1, and the second displacement ΔZ2 (step S28). The calculation unit 32 outputs the information on the first attitude angle θ and the information on the second attitude angle φ to the attitude determination unit 34.

Note that the first attitude angle measurement step S26 and the second attitude angle calculation step S28 may be carried out in this order, at the same time, or in the reverse order.

The attitude determination unit 34 obtains the information on the second attitude angle φ from the calculation unit 32. The attitude determination unit 34 obtains the information on the first attitude angle θ from the laser sensor 26. The attitude determination unit 34 determines the attitude of the gap measurement device 20 on the basis of the first attitude angle θ and the second attitude angle φ. Specifically, the attitude determination unit 34 first determines whether the first attitude angle θ is within a range defined by a threshold value, e.g. within a range of from −0.5° to 0.5°. The attitude determination unit 34 then determines whether the second attitude angle φ is within a range defined by a threshold value, e.g. within a range of from −0.5° to 0.5°. In a case where the attitude determination unit 34 determines that both the first attitude angle θ and the second attitude angle φ are within the predetermined ranges, the attitude is determined to be suitable, i.e., a suitable attitude for the gap measurement device 20 to measure the gap G. However, in a case where the attitude determination unit 34 determines that at least one of the first attitude angle θ and the second attitude angle φ is not within the predetermined range, the attitude is determined to be unsuitable, i.e., an unsuitable attitude for the gap measurement device 20 to measure the gap G (step S30). The attitude determination unit 34 outputs the results of determining the attitude to the calculation unit 32.

The calculation unit 32 obtains the results of determining the attitude from the attitude determination unit 34. In a case where the value of the gap G is to be displayed or stored, the calculation unit 32 can also cause the results of determining the attitude from the attitude determination unit 34 to be displayed or stored. Alternatively, the calculation unit 32 can cause the value of the gap G to be displayed or stored only when the determination results indicate the attitude is suitable; when the determination results indicate the attitude is unsuitable, rather than causing the value of the gap G to be displayed or stored, the calculation unit 32 can cause the gap G to be measured again after the attitude of the gap measurement device 20 has been corrected.

As described above, the gap measurement method carried out by the gap measurement device 20 according to the first embodiment further includes steps S22 to S30. In other words, the gap measurement method carried out by the gap measurement device 20 according to the first embodiment can determine whether the attitudes of the sensors of the gap measurement device 20 are suitable for measuring the gap, and thus non-uniformities between workers can be suppressed more reliably.

It is preferable that the gap measurement method according to the first embodiment of the present invention further include the step of moving an area where the gap is measured in which a driving device such as the robot arm 16 moves the area measured by the ultrasonic sensor 22 and the area measured by the laser sensor 26, thus moving the area where the gap G is measured in an XY plane direction, which is a direction parallel to the horizontal direction of the material 10, to be more specific, a direction parallel to the X-axis direction. Through this, the gap measurement method according to the first embodiment of the present invention can suppress non-uniformities in measurement of the gap G between workers and reduce the burden on the workers involved in measuring the gap G.

It is preferable that the gap measurement method according to the first embodiment of the present invention further include a pressure application step of applying pressure in a direction parallel to the thickness direction of the material 10, i.e. in the Z-axis direction. The roller sensor unit 22a of the ultrasonic sensor 22 may be pressed onto the upper surface 12a of the upper plate 12 from above the material 10 to apply the pressure. Alternatively, a pressurizing device provided near the gap measurement device 20 may be used to apply the pressure.

Through this, the gap G can be measured before the upper plate 12 and the lower plate 14 are joined. It is preferable that the gap measurement method according to the first embodiment of the present invention further include a pressure measurement step of measuring the pressure. The pressure can be measured by the displacement sensor 24. Through this, when the gap G formed between the upper plate 12 and the lower plate 14 is measured, the pressure, which is one condition of measuring the gap G, can be measured.

Figure 9:
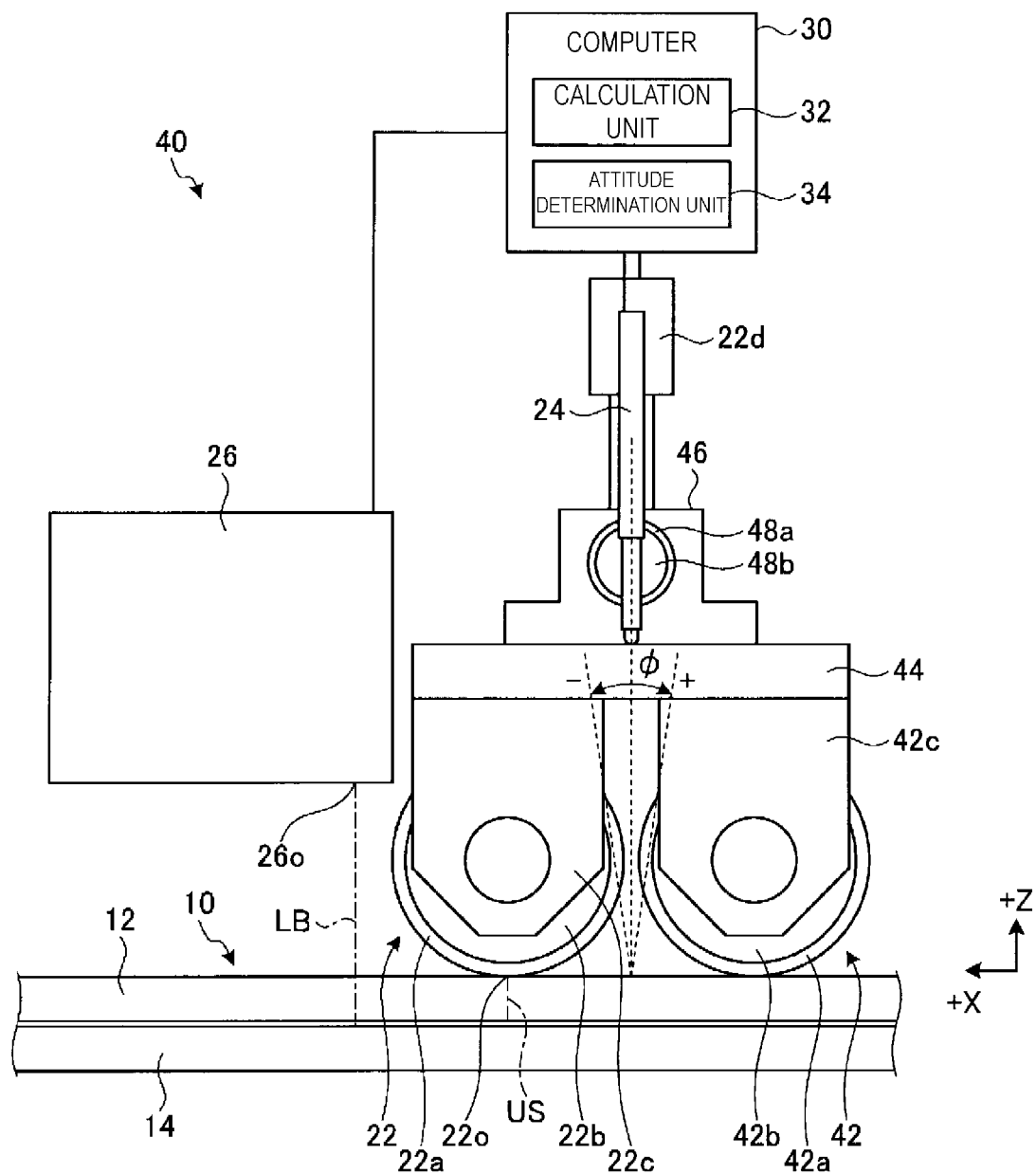
FIG. 9 is a diagram illustrating the configuration of a gap measurement device according to a second embodiment of the present invention.

FIG. 9 is a diagram illustrating the configuration of a gap measurement device 40 according to a second embodiment of the present invention. The gap measurement device 40 according to the second embodiment corresponds to the gap measurement device 20 according to the first embodiment that additionally includes a roller unit 42. As a result, the gap measurement device 40 according to the second embodiment corresponds to the gap measurement device 20 according to the first embodiment with a truck member 44, a shaft support member 46, a bearing 48a, and a shaft member 48b provided between the shaft support member 22c and the vertical support member 22d. Furthermore, as a result, the gap measurement device 40 according to the second embodiment corresponds to the gap measurement device 20 according to the first embodiment in which the position where the tip portion of the displacement sensor 24 is fixed has been changed from an area where the tip portion contacts the upper surface of the shaft support member 22c to an area where the tip portion contacts an upper surface of the truck member 44. Components in the gap measurement device 40 according to the second embodiment that are the same as the components in the first embodiment will be denoted as the same group of reference signs as in the first embodiment, and detailed descriptions thereof will be omitted.

The roller unit 42 has substantially the same components as the ultrasonic sensor 22 has, except that the ultrasonic sensor 22 is provided with the ultrasonic detection unit 22s that emits and detects ultrasonic waves. In other words, the roller unit 42 includes a roller 42a, side surface members 42b, and a shaft support member 42c. The vertical support member 22d included in the ultrasonic sensor 22 is a component shared by the ultrasonic sensor 22 and the roller unit 42.

The roller 42a has the same roller shape as the roller sensor unit 22a, and is supported so as to be rotatable about an axis extending in a direction parallel to an axis of the roller sensor unit 22a, to be more specific, an axis extending in the Y-axis direction. The side surface members 42b are, like the side surface members 22b of the ultrasonic sensor 22, members provided on both side surfaces of the roller 42a. In other words, in the side surface members 42b, side surfaces facing side surfaces of the roller 42a are planar in shape, and side surfaces on the sides opposite from the sides facing the roller 42a have, in central regions, cylindrical shaft projecting portions extending in an axial direction of the roller 42a. Like the shaft support member 22c of the ultrasonic sensor 22, the shaft support member 42c is a member having a U shape so as to enclose the side surfaces of the side surface members 42b that do not face the side surfaces of the roller 42a. In other words, the shaft support member 42c has fitting holes, into which the projecting portions of the side surface members 42b are fitted, in areas corresponding to the positions of the projecting portions. The shaft support member 42c supports the roller 42a and the side surface members 42b provided on both side surfaces thereof such that the roller 42a and the side surface members 42b are rotatable about an axis. In the roller unit 42, the roller 42a and the side surface members 42b function as a movable portion of the roller, and the shaft support member 42c functions as a fixed portion of the roller. In the roller unit 42, the roller 42a rotates along with the ultrasonic sensor 22 as the gap measurement device 40 moves in the X-axis direction along the material 10. In other words, with the roller unit 42 supported from above in the Z-axis direction, the roller 42a moves in the X-axis direction along the upper surface 12a of the upper plate 12 while rotating, along with the ultrasonic sensor 22.

The truck member 44 is a plate-shaped member extending in the direction of the XY plane, with a lower surface fixed to an area of the shaft support member 22c spanning the roller sensor unit 22a and the side surface members 22b, i.e. a surface at the central area of the U shape, and to an area of the shaft support member 42c spanning the roller 42a and the side surface members 42b, i.e. a surface at the central area of the U shape. The truck member 44 supports the shaft support member 22c and the shaft support member 42c from above in the Z-axis direction, and functions as a fixed portion shared by the ultrasonic sensor 22 and the roller unit 42. The truck member 44 moves along the upper plate 12 in a planar direction along the XY plane as the roller sensor unit 22a of the ultrasonic sensor 22 and the roller 42a of the roller unit 42 move, while rotating, along the upper surface 12a of the upper plate 12.

The roller unit 42 can stabilize the gap measurement device 40 on the upper surface 12a of the upper plate 12, and reduce slanting of the sensors of the gap measurement device 40 with respect to the upper surface 12a of the upper plate 12. In other words, the roller unit 42 makes it easier to put the attitude of the gap measurement device 40 in an attitude suitable for measuring the gap G. Although one roller unit 42 is illustrated in FIG. 9, there may be two or more. Preferably, the gap measurement device 40 has two roller units 42, and a triangle is formed by the two roller units 42 and the ultrasonic sensor 22. In this case, the gap measurement device 40 is supported by the ultrasonic sensor 22 and the two roller units 42 at three points, which provides further stability. Providing the gap measurement device 40 with a plurality of roller units 42 in a direction orthogonal to the travel direction, i.e. in the Y-axis direction, makes it possible to suppress situations where the gap measurement device 40 slants in a θ direction.

It is preferable that the roller unit 42 be further from the laser sensor 26 than the ultrasonic sensor 22. In other words, it is preferable that the ultrasonic sensor 22 be closer to the laser sensor 26 than the roller unit 42. In this case, differences in coordinates between the area measured by the ultrasonic sensor 22 and the area measured by the laser sensor 26 can be accurately corrected.

The shaft support member 46 is fixed to an upper surface of the truck member 44. The shaft support member 46 supports the shaft member 48b via the bearing 48a such that the shaft member 48b is rotatable about an axis extending in a direction parallel to the material 10, to be more specific, an axis extending in the Y-axis direction. The shaft support member 46 supports the shaft member 48b, via the bearing 48a, at an upper side thereof in the Z-axis direction and in the center thereof in the X-axis direction.

The shaft member 48b is a rod-shaped member extending in a direction parallel to the material 10, and more specifically is a rod-shaped member extending in the Y-axis direction. The shaft member 48b is supported by the shaft support member 46, via the bearing 48a, so as to be rotatable about an axis extending in a direction parallel to the material 10, to be more specific, an axis extending in the Y-axis direction. The vertical support member 22d is fixed to the shaft member 48b. The vertical support member 22d and the shaft member 48b function as fixed portions, and the shaft support member 46, the truck member 44, and the like function as movable members, around the shaft member 48b.

Although the position where the tip portion of the displacement sensor 24 is fixed has been changed from an area where the tip portion contacts the upper surface of the shaft support member 22c to an area where the tip portion contacts the upper surface of the truck member 44, the first displacement ΔZ1, which is the displacement in the Z-axis direction, of the vertical support member 22d is measured in the same manner as in the first embodiment. The first displacement ΔZ1 is a measurement amount including the same information as in the first embodiment.

The gap measurement device 40 according to the second embodiment is configured as described above, and thus the roller sensor unit 22a can be continuously moved in a stable manner along the material 10. Accordingly, non-uniformities between workers can be more reliably suppressed even when the measurement is consecutively performed at a plurality of gap measurement points.

Figure 10:
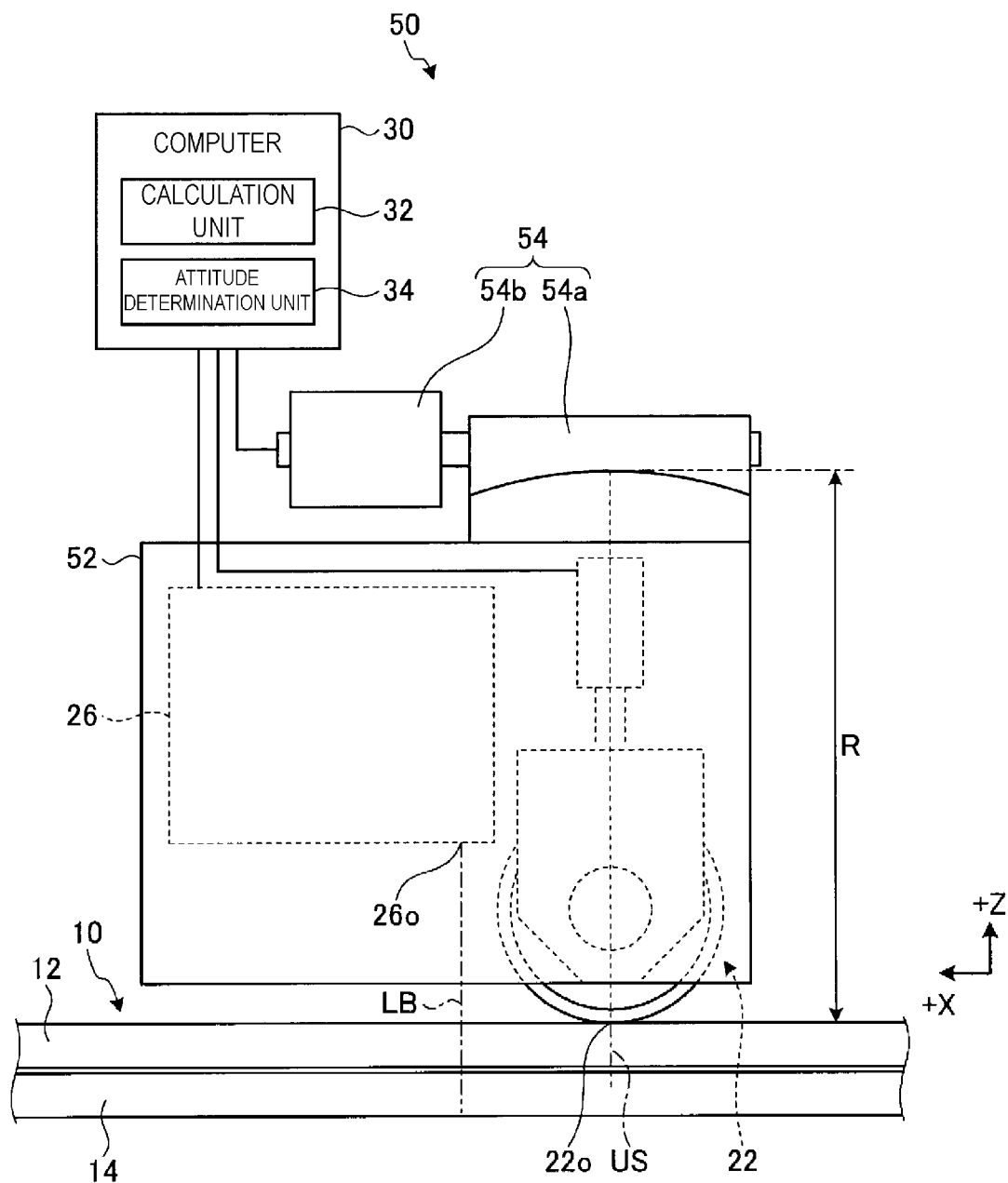
FIG. 10 is a diagram illustrating the configuration of a gap measurement device according to a third embodiment of the present invention.

FIG. 10 is a diagram illustrating the configuration of a gap measurement device 50 according to a third embodiment of the present invention. The gap measurement device 50 according to the third embodiment corresponds to the gap measurement device 20 according to the first embodiment that additionally include a gonio stage 54, and a casing 52 that supports and accommodates the ultrasonic sensor 22, the displacement sensor 24, and the laser sensor 26. Components in the gap measurement device 50 according to the third embodiment that are the same as the components in the first embodiment will be denoted as the same group of reference signs as in the first embodiment, and detailed descriptions thereof will be omitted.

The gonio stage 54 includes a stage part 54a and a stage drive part 54b. The stage part 54a grips the casing 52 such that the casing 52 is movable along a circular arc plane that has a radius R and is centered on the ultrasonic wave emission port 22o of the ultrasonic sensor 22. Here, the radius R is a distance between a central part of the stage part 54a of the gonio stage 54 and the upper surface 12a of the upper plate 12. In other words, the stage part 54a grips the casing 52 such that the casing 52 is movable relative to the upper surface 12a of the upper plate 12 in the direction of the first attitude angle θ and the direction of the second attitude angle φ, central to the ultrasonic wave emission port 22o. The stage drive part 54b is a drive part that drives the stage part 54a, and is communicatively connected to the computer 30. As illustrated in FIG. 4, when the attitude determination unit 34 has determined that the attitude of the gap measurement device 50 is an unsuitable attitude for measuring the gap G, the stage drive part 54b can correct the attitude of the gap measurement device 50 by driving the stage part 54a in accordance with a corrected value for the attitude calculated by the calculation unit 32 on the basis of the information on the first attitude angle θ and the second attitude angle φ. The gonio stage 54 is configured as described above, and thus functions as an attitude control device that controls the attitude of the gap measurement device 50.

In the gap measurement device 50 according to the third embodiment, the calculation unit 32 and the attitude determination unit 34 have more functions than the calculation unit 32 and the attitude determination unit 34 have in the gap measurement device 20 according to the first embodiment. In a case where the attitude of the gap measurement device 50 is determined to be an unsuitable attitude for measuring the gap G, the attitude determination unit 34 outputs information on that determination result to the calculation unit 32. Upon obtaining information on the determination result from the attitude determination unit 34 indicating that the attitude of the gap measurement device 50 is an unsuitable attitude for measuring the gap G, the calculation unit 32 calculates an attitude correction value on the basis of the information on the first attitude angle θ and the second attitude angle φ, and sends the calculated attitude correction value to the stage drive part 54b of the gonio stage 54.

Actions of the gap measurement device 50 according to the third embodiment having the above configuration will be described below. In addition to the gap measurement method according to the first embodiment of the present invention, the gap measurement device 50 further executes an attitude correction value calculation step and an attitude correction step. The attitude correction value calculation step is a step in which, upon obtaining information on a determination result from the attitude determination unit 34 indicating that the attitude of the gap measurement device 50 is an unsuitable attitude for measuring the gap G, the calculation unit 32 calculates the attitude correction value on the basis of the information on the first attitude angle θ and the second attitude angle φ. The attitude correction step is a step, carried out after the attitude correction value calculation step, in which the stage drive part 54b corrects the attitude of the gap measurement device 50 by driving the stage part 54a in accordance with the attitude correction value received from the calculation unit 32.

As described above, the gap measurement method carried out by the gap measurement device 50 according to the third embodiment further has the attitude correction value calculation step and the attitude control step. In other words, the gap measurement method carried out by the gap measurement device 50 according to the third embodiment can correct the attitudes of the sensors to suitable attitudes for measuring the gap G, and thus non-uniformities between workers can be suppressed even more reliably.

REFERENCE NUMERALS

10 Material
12 Upper plate
12a Upper surface
12b Lower surface
14a Upper surface
14 Lower plate
16 Robot arm
18 Robot control unit
20, 40, 50 Gap measurement device
22 Ultrasonic sensor (plate thickness measurement sensor)
22a Roller sensor unit
22b Side surface member
22c Shaft support member
22d Vertical support member
22o Ultrasonic wave emission port
22s Ultrasonic detection unit
24 Displacement sensor
26 Laser sensor (step measurement sensor)
26o Laser emission port
30 Computer
32 Calculation unit
34 Attitude determination unit
42 Roller unit
42a Roller
42b Side surface member
42c Shaft support member
44 Truck member
46 Shaft support member
48a Bearing
48b Shaft member
52 Casing
54 Gonio stage
54a Stage part
54b Stage drive part

The invention claimed is:

1. A gap measurement device that measures a gap between an upper plate and a lower plate in a material formed of the upper plate and the lower plate that overlap with each other in a thickness direction, the device comprising:
   a plate thickness measurement sensor that measures a plate thickness, the plate thickness being a thickness of the upper plate;
   a step measurement sensor that measures a step, the step being a distance between an upper surface of the upper plate and an upper surface of the lower plate;
   a calculation unit that calculates the gap between the upper plate and the lower plate by subtracting the plate thickness from the step;
   a displacement sensor that measures a first displacement, the first displacement being a displacement, in the thickness direction, of a support portion supporting the plate thickness measurement sensor in a vertical direction; and
   an attitude determination unit that determines an attitude of the plate thickness measurement sensor facing the upper surface of the upper plate,
   wherein the step measurement sensor measures a second displacement and a first attitude angle, the second displacement being a displacement of the step measurement sensor in the thickness direction, and the first attitude angle being an attitude angle of the step measurement sensor facing the upper surface of the upper plate,
   the calculation unit calculates a second attitude angle, based on a distance between the plate thickness measurement sensor and the step measurement sensor at each of measurement points, the first displacement, and the second displacement, the second attitude angle being a component of an attitude angle of the plate thickness measurement sensor facing the upper surface of the upper plate; and
   the attitude determination unit determines the attitude, based on the first attitude angle and the second attitude angle.

2. The gap measurement device according to claim 1, further comprising:
a gonio stage that grips the plate thickness measurement sensor, the step measurement sensor, and the displacement sensor such that the plate thickness measurement sensor, the step measurement sensor, and the displacement sensor are movable along a circular arc plane that takes a distance from the upper surface of the upper plate as a radius,
wherein in a case where the attitude is determined to be unsuitable for measuring the gap, the calculation unit calculates a correction value for the attitude and sends the correction value to the gonio stage, and
the gonio stage corrects the attitude in accordance with the correction value received from the calculation unit.

3. The gap measurement device according to claim 1, wherein the displacement sensor further measures a pressure applied to the upper plate by the plate thickness measurement sensor.

4. The gap measurement device according to claim 1, wherein the plate thickness measurement sensor is an ultrasonic sensor that emits ultrasonic waves toward the upper surface of the upper plate from above the upper plate and detects the ultrasonic waves reflected by the upper surface and a lower surface of the upper plate.

5. The gap measurement device according to claim 1, wherein the plate thickness measurement sensor includes a roller sensor unit, the roller sensor unit being supported to be rotatable about an axis parallel to the material, and rotating in response to movement along the material.

6. The gap measurement device according to claim 5, further comprising a roller provided parallel to the roller sensor unit and on the same side of the material as the roller sensor unit, the roller being supported to be rotatable about an axis extending in a direction parallel to an axis of the roller sensor unit, and rotating along with the roller sensor unit in response to movement along the material.

7. The gap measurement device according to claim 1, wherein the step measurement sensor is a laser sensor that emits a laser from above the upper plate toward an area where both the upper plate and the lower plate are exposed on top of the material, and detects the laser reflected by the upper surface of the upper plate and the upper surface of the lower plate.

8. The gap measurement device according to claim 1, further comprising:
a driving device that grips the plate thickness measurement sensor and the step measurement sensor such that the plate thickness measurement sensor and the step measurement sensor are movable in three-dimensional directions.

9. A gap measurement method for measuring a gap between an upper plate and a lower plate in a material formed of the upper plate and the lower plate that overlap with each other in a thickness direction, the method comprising the steps of:
measuring a plate thickness with a plate thickness measurement sensor, the plate thickness being a thickness of the upper plate;
measuring a step with a step measurement sensor, the step being a distance between an upper surface of the upper plate and an upper surface of the lower plate; and
calculating the gap between the upper plate and the lower plate by subtracting the plate thickness from the step, the gap measurement method further comprising the steps of:
measuring a first displacement, the first displacement being a displacement, in the thickness direction, of a support portion supporting the plate thickness measurement sensor in a vertical direction;
measuring a second displacement, the second displacement being a displacement, in the thickness direction, of the step measurement sensor;
measuring a first attitude angle, the first attitude angle being an attitude angle of the step measurement sensor facing the upper surface of the upper plate;
calculating a second attitude angle, based on a distance between the plate thickness measurement sensor and the step measurement sensor at each of measurement points, the first displacement, and the second displacement, the second attitude angle being a component of an attitude angle of the plate thickness measurement sensor facing the upper surface of the upper plate; and
determining the attitude, based on the first attitude angle and the second attitude angle.

10. The gap measurement method according to claim 9, further comprising the steps of:
calculating, in a case where the attitude is determined to be unsuitable for measuring the gap, a correction value for the attitude; and
correcting the attitude in accordance with the correction value.

11. The gap measurement method according to claim 9, wherein the step of measuring a plate thickness measures the plate thickness by emitting ultrasonic waves toward the upper plate from above the upper plate and detecting the ultrasonic waves reflected by the upper surface and a lower surface of the upper plate.

12. The gap measurement method according to claim 9, wherein the step of measuring a step measures the step by emitting a laser from above the upper plate toward an area where both the upper plate and the lower plate are exposed on top of the material, and detecting the laser reflected by the upper surface of the upper plate and the upper surface of the lower plate.

13. The gap measurement method according to claim 9, further comprising the step of moving an area where the gap is measured along a horizontal direction of the material.

14. The gap measurement method according to claim 9, further comprising the steps of:
applying a pressure to the material along the thickness direction of the material when measuring the gap; and
measuring the pressure.

* * * * *